No. 730,702. Patented June 9, 1903.

UNITED STATES PATENT OFFICE.

ALEXANDER SYDNEY RAMAGE, OF CLEVELAND, OHIO.

PROCESS OF PRODUCING FROM MILK A FOOD PRODUCT.

SPECIFICATION forming part of Letters Patent No. 730,702, dated June 9, 1903.

Application filed January 27, 1902. Serial No. 91,416. (No specimens.)

*To all whom it may concern:*

Be it known that I, ALEXANDER SYDNEY RAMAGE, a citizen of the United States, residing at Cleveland, in the State of Ohio, have invented new and useful Improvements in Processes of Producing from Milk a Food Product, of which the following is a specification.

This invention consists in a process of treating milk, and more especially skim-milk, to produce therefrom a nutrient product.

In carrying out this process skim or other milk is rendered slightly alkaline with any suitable agent—for example, lime-water or sodium carbonate. It is then heated about 40° centigrade and just sufficient rennet or other coagulating agent added to set the whole. It is then allowed to stand until the entire mass is converted into a curd having about the consistency of custard. The preliminary treatment with lime-water results in the production of a finely-granulated curd instead of one in the form of large masses. The mass is now pressed and the whey run off for other use. The casein is now thoroughly washed, placed in an autoclave, and subjected to the action of superheated steam at a pressure of one hundred pounds per square inch for three hours, and is thereby converted into a liquid condition, constituting an atmid-caseose, which is highly nourishing and is capable of being readily assimilated by invalids.

I claim—

1. The process of producing a food product from casein, which consists in digesting the casein with steam at a pressure of about one hundred pounds per square inch until it is converted into a liquid atmid-caseose, as set forth.

2. The process of producing a food product from milk, which consists in rendering the milk slightly alkaline, heating, adding a coagulating agent, and digesting the resulting casein with steam, at a pressure of about one hundred pounds per square inch, until converted into liquid atmid-caseose, as set forth.

In testimony whereof I affix my signature in presence of two witnesses.

ALEXANDER SYDNEY RAMAGE.

Witnesses:
A. E. GILBERT,
C. R. CARRUTH.